Patented Feb. 6, 1940

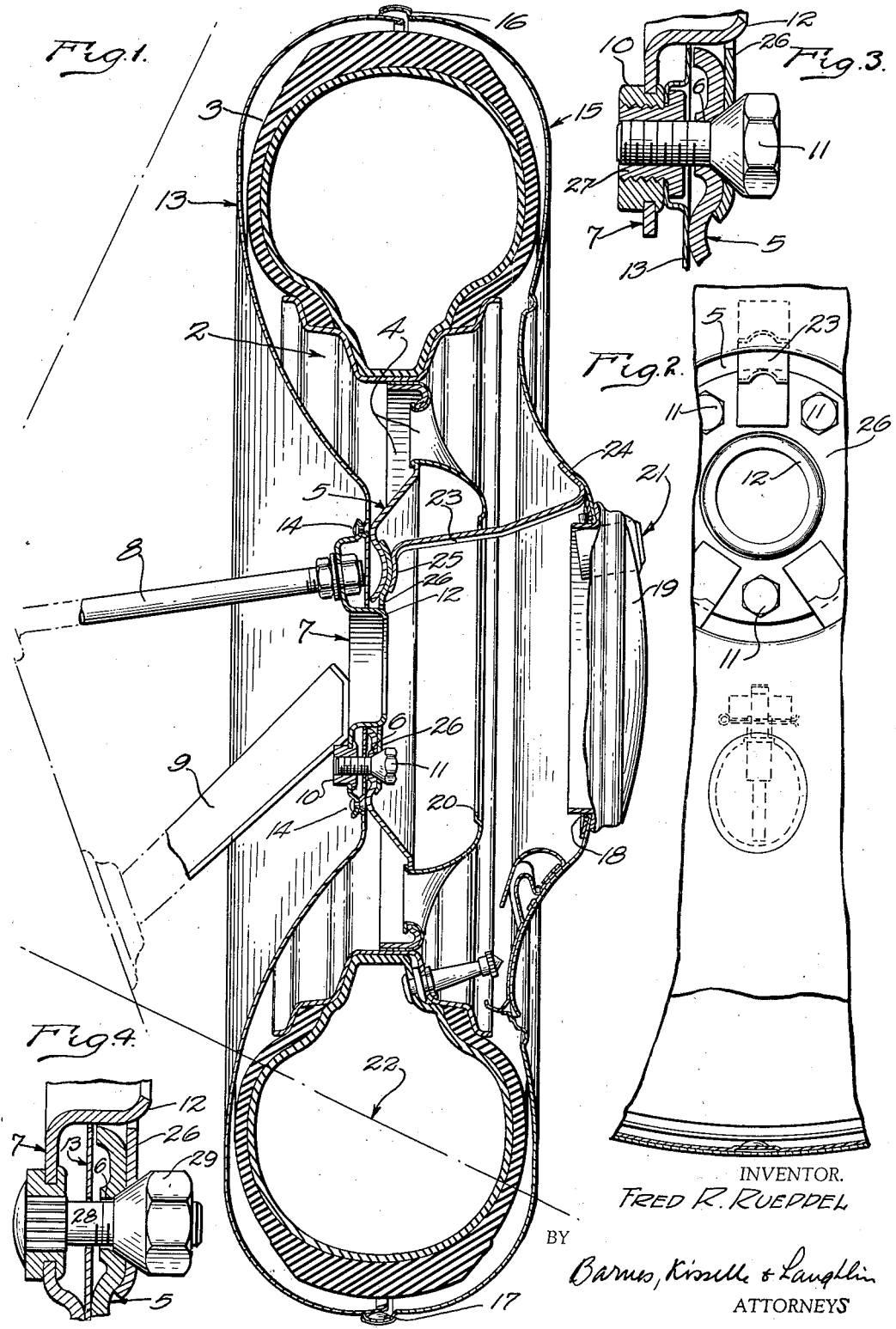

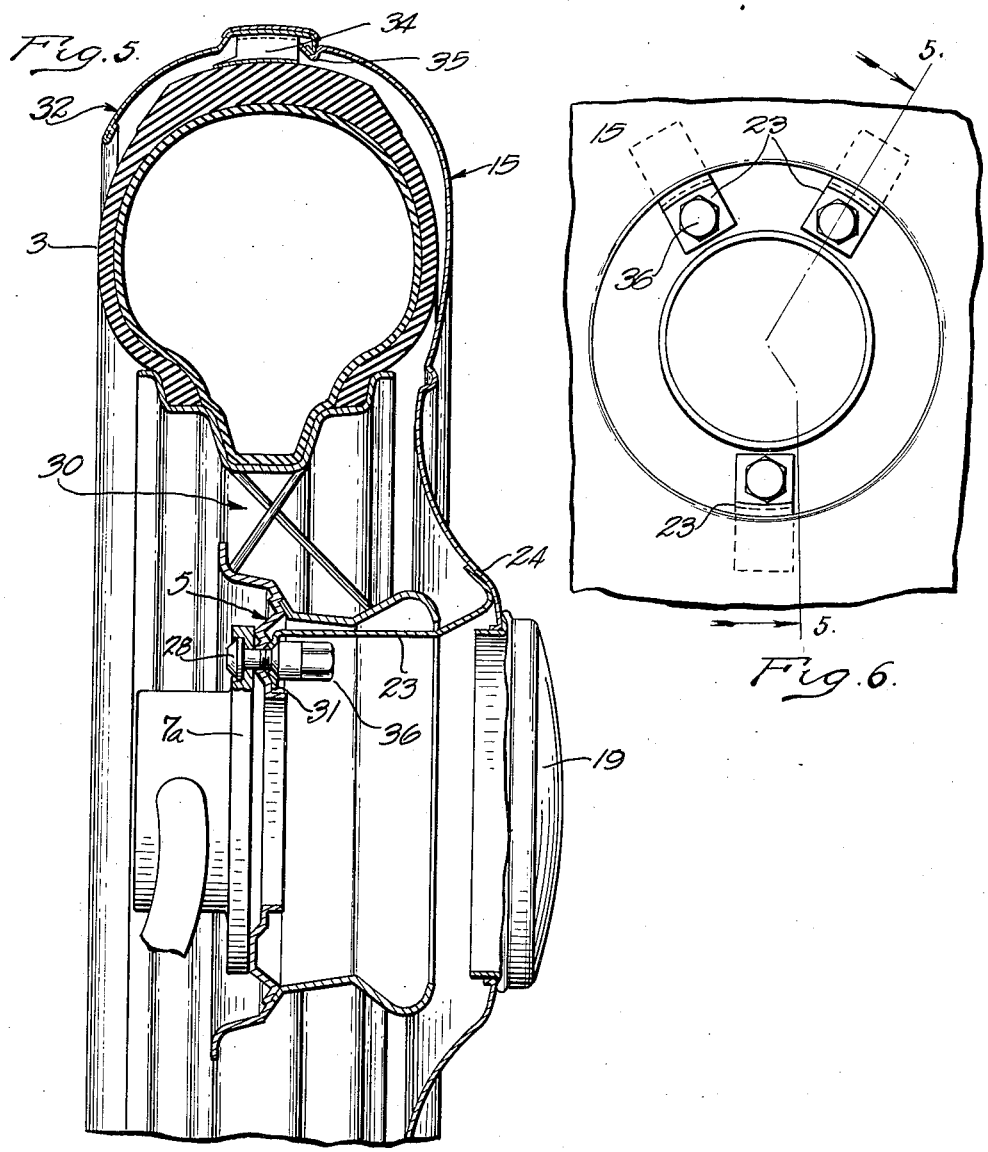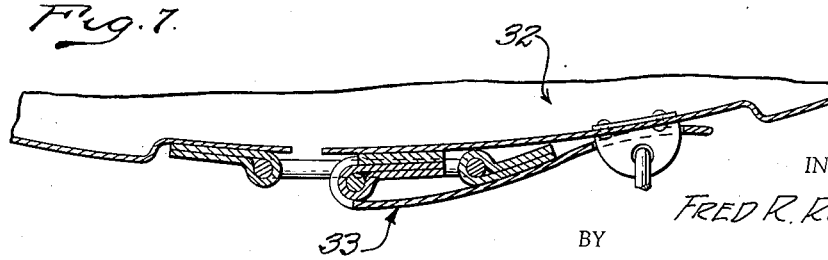

2,189,407

UNITED STATES PATENT OFFICE 2,189,407

SPARE WHEEL AND TIRE COVER ASSEMBLY

Fred R. Rueppel, East Detroit, Mich., assignor to Clayton & Lambert Manufacturing Company, Detroit, Mich., a corporation of Delaware Application January 2, 1934, Serial No. 704,850

16 Claims. (Cl. 150—54)

This invention relates to a spare wheel and tire cover assembly, and more particularly to a wheel assembly of the type having hubs adapted to be connected to the axle spindle and to the spare tire bracket, and also more particularly to tire covers of the drum type.

In recent years the tire cover trend has been towards that type of cover adapted to be supported by the spare tire itself, with the result that if the spare tire is removed for repair and the like, the unsightly wheel bracket is exposed. It is one of the objects of this invention to provide a cover and wheel assembly wherein the cover, even if normally partially held in position by the tire, may be directly positioned and secured to the spare tire bracket even if the spare wheel is removed.

More specifically, the present invention relates to spare wheel and tire cover assemblies of the general type disclosed by Draver Patent 1,321,017 of November 4, 1919, where the wheel and hub is positioned on a spindle and the cover secured in position against the tire, by Draver 1,379,297 of May 24, 1921 and Walrath 1,658,696 of February 7, 1928.

One of the specific improvements of applicant's tire and cover assembly is that instead of using a concealed axially positioned securing bolt or nut, as in Walrath, or an exposed axially positioned nut as in Draver, applicant preferably utilizes the same fastening means for securing his drum cover in position as are used for securing the hub of the spare wheel in position on the bracket. The result is that in removing the tire cover to permit access to the tire and wheel, it is only necessary to remove the same fastening means that must be removed in removing the tire and wheel.

Another feature of the invention is the provision of means whereby the drum cover member may be securely fixed in position and in the same position relative to the body of the car and the spare tire bracket whether or not it conceals the tire and wheel.

Another feature of the present invention contemplates a cover and assembly design whereby the cover members do not contact with the tire, nor do they require contact for any positioning; the result is that such cover will adapt itself to substantially any size tire and any make or shape of wheel and hub; in the preferred embodiment, the front drum cover, or any part thereof, does not contact with either the wheel or the tire.

Other features of the invention, including the combination of the wheel and cover assembly of the type disclosed in Patent 1,900,822 of March 7, 1933, will be more clearly set forth in the specification and claims.

In the drawings:

Fig. 1 is a vertical sectional view of one form of wheel and tire cover assembly, as used in connection with the rear tire cover supporting bracket, and showing particularly the back cover member riveted in position as part of the supporting bracket.

Fig. 2 is a fragmentary elevation and cross section with the hub cap removed from the drum cover.

Fig. 3 is an enlarged detail sectional view of a modified assembly and fastening arrangement by means of which the back cover is held in position.

Fig. 4 is another enlarged detail view of a modified assembly and fastening arrangement wherein the fastening bolt is formed as a part of the bracket.

Fig. 5 is a vertical sectional view taken on line 5—5 of Fig. 6 of the preferred embodiment of my invention wherein the cover may be held in position either by the tire or by the concealed fastening means or both, the showing being on a support which may be either a side or rear model.

Fig. 6 is a fragmentary front elevation of the structure shown in Fig. 5, with the hub cap removed.

Fig. 7 is a fragmentary sectional view taken through the periphery of the cover illustrating particularly the toggle clamping means for contracting the rear cover member.

In Fig. 1 I have shown a wheel 2 carrying a wire 3 and provided with stamped sheet metal spokes 4. Such spokes 4 terminate in a hub 5 which is provided with a plurality of circumferentially spaced apertures 6 to permit the wheel to be secured by suitable bolts to the flange adjacent the inner end of the axle spindle.

It will be understood by those skilled in the art that the tire and wheel may be mounted, as a spare tire and wheel, in many different manners, but in the present invention I preferably utilize a standard type supporting bracket 7 carried in the present instance by suitable arms 8 and 9, and which supporting bracket is preferably provided with three nuts 10 so positioned as to correspond with three of the apertures 6 in the hub 5, so that when the three apertures in the hub 5 are positioned in alignment with the nuts 10, suitable bolts 11 (such as used in fastening the wheel in its position on the axle) may be used to secure the hub and wheel in fixed position on the bracket 7. Ready axial alignment of the hub 5 with the bracket 7 is obtained by a struck-out cylindrical portion 12 which centers and assists in supporting the hub to make for easy registration between the nuts 10 and the bolts or cap screws 11.

In this same Fig. 1 embodiment a rear half sheet metal cover member 13 extends from a point substantially at the median plane of a tire all the way down to the embossed portion 12 of the flange 7 and is rigidly mounted on the bracket 7 by rivets 14. The front half of the cover, generally designated 15, preferably terminates in a bead 16 which cooperates with the inner edge of the back cover member and which bead is provided with spaced rubber lugs 17 for preventing rattling between the two cover parts. The front portion of the front half of the cover 15 extends either solidly or in a suitable fabricated design towards the center of the wheel and preferably terminates in an aperture 18 of such a diameter as to receive a hub cap 19. The aperture 18 is preferably the same size as the aperture 20 in the wheel hub 5 so as to permit interchangeability between the tire cover hub cap and the hub caps used when the wheel is in position on the axle. Thus, it is only necessary to remove the hub cap 19 to permit access to the three bolts or cap screws 11 whereby to permit removal of the front cover member 15 and the tire and wheel assembly.

The hub cap may be locked in position as by means of a suitable cylinder lock 21 which will serve to lock both the wheel and cover on the car. It will thus be seen that the ordinary hub cap forming a part of the spare wheel or wheels may be removed and inserted in the cover which is then removable to permit access to both the hub fastening means and the cover fastening means which, in the present instance, are the same fastening means. It will also be seen that the cover is so designed that there will be no contact whatsoever between the cover and tire, thus permitting the same cover to be used with many different sizes of tires and also to permit complete ventilation around the tire. The position of my spare tire cover and wheel assembly when mounted on the rear of the car will be appreciated, and it will be understood that the dot and dash line 22 represents the ground line.

The front cover member 15 is fixedly held in position at all times, that is whether or not a tire is enclosed, by means of suitable strap members 23 welded at one end as at 24 to the front half of the tire cover and welded at the other end as at 25 to an annular ring member 26, said annular member 26 having apertures adapted to register with the apertures 6 in the hub cap. It will thus be seen that I have provided a complete rigid assembly between the flange 7, the hub cap 5 and the annular ring 26 of the front half 15 of the tire cover. If the wheel is not in use, that is if it is being left at a tire repair shop, or the like, it will be obvious that the ring 26, in assembling the empty tire cover, will be merely moved inwardly the thickness of the flange of the hub cap, which small thickness will be easily accommodated by the co-operating peripheral edges of the inner and outer cover members 13 and 15. Thus, the removal or assembly of the tire is accomplished by the simple step of removing the fastening members 11, which members must be removed in removing the wheel. Thus no springing, collapsing or extending of any tire cover, or any part thereof, is necessary in removing or assembling the same. As the concealed fastening means or ring 26 is separated from the supporting bracket 7 only by the relatively thin flange of the hub cap, it will be seen that the assembly of the tire cover without a tire still presents substantially the same dimensions in giving the obvious impression that a tire is enclosed. No auxiliary flanges of any kind are necessary, such as are used in Draver 1,322,680 and Draver 1,311,267.

In the modification illustrated in Fig. 3, an auxiliary nut 27 is adapted to be positioned within the standard nut 10 of the bracket 7. This permits the inner cover member 13 to be apertured and secured in place upon any standard bracket, whereas in the embodiment shown in Fig. 1, the riveting of the rear cover member to the bracket is preferably done in a case where this type of tire cover is used as original equipment.

In the modification illustrated in Fig. 4, a bolt or stud 28 is shown mounted on the flange 7 instead of the nut 10, as in Figs. 1 and 3. The shank of such stud 28 will serve as a positioning and supporting means for the back cover member 13 and will also assist in aligning and locating the hub 5 and annular fastening member 26, and the nut 29 to correspond with the head of the bolt or stud 11.

In the preferred embodiment shown in Fig. 5, the structure of the front half 15 of the cover is substantially the same. A wire wheel 30 with a slightly different form of hub cap 5 is shown. A bracket 7a is apertured to receive a plurality of fastening members or studs 28 which register with apertures in the hub 5 in the well known manner, and also in the same manner as described in connection with Fig. 1. The arms or brace members 23 terminate in an inturned apertured portion 31 adapted to register with the shank of the threaded studs 28; it will be understood, however, that the inturned portion 31 may be in the form of an annular ring, as shown at 26 in Fig. 1. The rear half of the cover member, generally designated 32, is of the general type disclosed in application Serial No. 563,566 of September 17, 1931, in that it extends only far enough to the rear of the tire as to cover up the tire when viewed from the side of the car or from the inside of the car in case of side mounts. This rear half of the cover is split and is adapted to be expanded and contracted by a suitable toggle clamp 33. Springs 34 circumferentially spaced around the inside of the bead are adapted to contact with the tire so as to adapt the cover to tires of different sizes and to hold the same securely against rattling. An inturned flange on the edge of the rear cover member 32 cooperates with a flange 35 at the inner edge of the outer cover member 15 so that when the back cover member is contracted, these flanges will interfit and secure the front cover member in position.

Thus, when the tire and wheel are supported on the bracket 7a, the cover member will be supported on the tire and will be also held in place by the arms or brackets 23 clamped in place by the nuts 36, one of which may be a locking type nut, as shown in Fig. 5. Thus, regardless of any size of tire or regardless of the fit between the back cover member and the tire, the concealed fastening means or brackets 23 will hold the tire cover securely and fixedly in position at the center. If it is desired to leave the tire and wheel assembly at some garage for repair, the fit between the flange 35 of the front cover and the collapsible flange of the back cover is such that the front cover may be held in place through the medium of the brackets 23 and the nuts 36, and the back cover will be held in position because of the inner clamping arrangement between the front and back cover. Thus, this type of cover is ideally adapted for side mounts and, of course, is equally well adapted for rear mounts.

What I claim is:

1. A wheel and cover assembly comprising a support having means for carrying a spare wheel and tire, a rear cover member mounted on said support, an apertured front cover member out of contact with but covering substantially all of the face portion of the tire and wheel assembly, common fastening means cooperating with said first means for securing the wheel and/or front cover in position on said support, and means normally filling said aperture and removable to permit access to said fastening means.

2. A wheel and cover assembly comprising a support having means for carrying a spare wheel and tire, a rear cover member rigidly mounted on said support, an apertured front cover member covering substantially all of the face portion of the tire and wheel assembly, common fastening means cooperating with said first means for securing the wheel and/or front cover in position, and means normally filling said aperture and removable to permit access to said fastening means.

3. A wheel and rigid cover assembly comprising a support for carrying a spare wheel and tire, an apertured front cover member covering substantially all of the face portion of the tire and wheel assembly and having inwardly extending concealed supporting means, and common fastening means accessible through said aperture and cooperating with said wheel support and cover supporting means for securing the wheel and/or front cover in position, and means normally filling said aperture and removable to permit access to said fastening means.

4. A wheel and rigid cover assembly comprising a support for carrying a spare wheel and tire, a rear cover member, an apertured front cover member covering substantially all of the face portion of the tire and wheel assembly, common fastening means for securing the wheel and/or front cover in position, and means normally filling said aperture and removable to permit access to said fastening means.

5. A wheel and cover assembly comprising a support for carrying a spare wheel and tire, a rear cover member mounted on said support, an apertured front cover member covering substantially all of the face portion of the tire and wheel assembly, common fastening means for securing the wheel and front cover in position, and means normally filling said aperture and removable to permit access to said fastening means, the cover members and wheel being each individually and independently carried by said support and same common fastening means.

6. A wheel and cover assembly comprising a support for carrying a spare wheel and tire, a rear cover member, an apertured drum type front cover cooperating about its outer periphery with said rear member, common fastening means for securing the wheel and/or front cover in position, and means normally filling said aperture and removable to permit access to said fastening means.

7. A wheel and rigid cover assembly comprising a support for carrying a spare wheel and tire, fastening means mounted on said support cooperating with certain standard apertures in the wheel hub, and a front cover member having concealed supporting means cooperating with said fastening means whereby to support the front cover member in position independently of the wheel and tire.

8. A wheel and rigid cover assembly comprising a support for carrying a spare wheel and tire, fastening means mounted on said support cooperating with certain standard apertures in the wheel hub, and a front cover member having concealed supporting means cooperating with said fastening means and being drawn firmly by said fastening means into contact with the hub of said wheel or with said supporting means.

9. A wheel and rigid cover assembly comprising a support for carrying a spare wheel and tire, fastening means mounted on said support cooperating with certain standard apertures in the wheel hub flange, and a front cover member having concealed supporting means cooperating with said fastening means and being drawn firmly by said fastening means into contact with the hub of said wheel or with said supporting means, the difference in the actual position of the front cover member with and without the wheel being merely the thickness of the hub flange cooperating with said support whereby said cover member will assume substantially the same position regardless of whether or not it covers the tire.

10. A spare tire cover of the drum type for use in connection with spare wheels including an apertured hub and fastening means accessible through the hub for fastening the spare wheel to the support on the vehicle, and supporting means secured to a part of said cover and cooperating with said same fastening means whereby removal of the fastening means through said aperture will permit removal of both the cover and the spare wheel and permit the securing of said second supporting means to the spare wheel support without the wheel.

11. A spare tire cover for use in connection with spare wheel including an apertured hub and fastening means accessible through the hub for fastening the spare wheel to the support on the vehicle, supporting means secured to a part of said cover and cooperating with said same fastening means whereby removal of the fastening means through said aperture will permit removal of both the cover and the spare wheel and permit the securing of said second supporting means to the spare wheel support without the wheel, and means normally filling said aperture and removable to permit access to said fastening means.

12. A spare tire cover for use in connection with spare wheels including a rear cover member adapted to be mounted on the spare wheel support of a vehicle, fastening means mounted on said support, an apertured front cover member and auxiliary supporting members secured to said front cover member and adapted to cooperate with the fastening means for securing the spare wheel to the spare tire support.

13. A spare tire cover for use in connection with spare wheels including a rear cover member adapted to be mounted on the spare wheel support of a vehicle, an apertured front cover member, and auxiliary supporting members secured to said front cover member and adapted to cooperate with the fastening means for securing the spare wheel to the spare tire support, said auxiliary supporting means cooperating with said fastening means whereby to position and hold the cover parts in proper relationship even when a tire and wheel is not enclosed.

14. A spare tire cover for use in connection with spare wheels including a rear cover member adapted to be mounted on the spare wheel support of a vehicle, an apertured front cover member, auxiliary supporting means secured to said front cover member and adapted to cooperate with the fastening means for securing the spare wheel to the support, said auxiliary supporting means further cooperating with said fastening means to position and hold the cover members in proper relationship even when a tire and wheel is not enclosed, and means normally filling said aperture and removable to permit access to said fastening means.

15. A wheel and cover assembly comprising a support for carrying a spare wheel, an apertured front cover member normally held in position on said tire by a contractible rear cover member, and auxiliary supporting means secured to the rear face of said front cover member and extending rearwardly through the hub of the spare wheel and cooperating with said support whereby the complete cover member may be supported on said support independently of the tire.

16. A wheel and rigid cover assembly comprising a support for carrying a spare wheel and tire and a rear cover member, an apertured front cover member covering substantially all of the face portion of the tire and wheel assembly, and having inwardly extending concealed supporting means and common fastening means accessible through said aperture and cooperating with said wheel support and cover supporting means for securing the wheel and/or front cover in position and means normally filling said aperture and removable to permit access to said fastening means.

FRED R. RUEPPEL.